(12) United States Patent
Abramovitz

(10) Patent No.: US 11,729,682 B2
(45) Date of Patent: Aug. 15, 2023

(54) DEVICE AND METHOD FOR PREDICTION OF METRICS IN A WIRELESS NETWORK WITH MULTIPLE ACCESS POINTS

(71) Applicant: AIRTIES BELGIUM SPRL, Woluwe-Saint-Lambert (BE)

(72) Inventor: Assi Abramovitz, Netanya (IL)

(73) Assignee: AIRTIES BELGIUM SPRL, Woluwe-Saint-Lambert (BE)

( * ) Notice: Subject to any disclaimer, the term of this patent is extended or adjusted under 35 U.S.C. 154(b) by 0 days.

(21) Appl. No.: 17/963,804

(22) Filed: Oct. 11, 2022

(65) Prior Publication Data

US 2023/0036895 A1 Feb. 2, 2023

Related U.S. Application Data

(63) Continuation of application No. 16/643,272, filed as application No. PCT/IL2017/050971 on Aug. 30, 2017, now Pat. No. 11,470,521.

(51) Int. Cl.
*H04W 36/08* (2009.01)
*H04W 36/00* (2009.01)
*H04W 84/12* (2009.01)

(52) U.S. Cl.
CPC ....... *H04W 36/0088* (2013.01); *H04W 36/08* (2013.01); *H04W 84/12* (2013.01)

(58) Field of Classification Search
CPC . H04W 36/08; H04W 36/0088; H04W 84/12; H04L 12/50
USPC ................ 370/400, 401, 402, 395
See application file for complete search history.

(56) References Cited

U.S. PATENT DOCUMENTS

| | | |
|---|---|---|
| 11,520,332 B1 * | 12/2022 | Zamiska .............. G05D 1/0251 |
| 2008/0112346 A1 | 5/2008 | Tolpin et al. |
| 2014/0269356 A1 | 9/2014 | Lai et al. |
| 2014/0341069 A1 | 11/2014 | Alon |
| 2015/0268326 A1 | 9/2015 | Sung |
| 2017/0238304 A1 | 8/2017 | Ling et al. |
| 2020/0334696 A1 | 10/2020 | Ansari et al. |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

(Continued)

*Primary Examiner* — Dang T Ton
(74) *Attorney, Agent, or Firm* — Volpe Koenig

(57) ABSTRACT

To predict a first metric for a station in a wireless network, at least one hardware processor in a prediction device or at least one hardware processor in a first access point associated with the station, determines that a recent measurement of a second metric correlated with the first metric has hanged compared to a previous measurement of the second metric, the second metric for the station and measured by the first access point; and in case the second metric has changed, prediction of the first metric for the station is triggered. The first metric can be a signal strength of a signal received by the station from a second access point not associated with the station and the second metric a signal strength of a signal received by the first access point from the station.

18 Claims, 3 Drawing Sheets

(56) References Cited

OTHER PUBLICATIONS

IEEE Standard for Information technology—Telecommunications and information exchange between systems—Local and metropolitan area networks—Specific requirements. Part 11: Wireless LAN Medium Access Control (MAC) and Physical Layer (PHY) Specifications. Amendment 1: Radio Resource Measurement of Wireless LANs, IEEE Std. 802.11k-2008 (Jun. 12, 2008).

* cited by examiner

DEVICE AND METHOD FOR PREDICTION OF METRICS IN A WIRELESS NETWORK WITH MULTIPLE ACCESS POINTS

TECHNICAL FIELD

The present disclosure relates generally to wireless networks and in particular to wireless networks with multiple Access Points (APs).

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

FIG. 1 illustrates an exemplary conventional wireless local area network (WLAN) 100 with a plurality of wireless Access Points (APs) 110, 120 and a mobile station 130. The WLAN can for example be a Wi-Fi network compatible with IEEE 802.11 (that will be used as a non-limitative example), a Bluetooth® network or a cellular network. The mobile station 130 can for example be a personal computer, a mobile phone (smartphone), a set-top box or a tablet.

In such a network, each AP can communicate with the mobile station using a channel, i.e. frequencies, distinct from the channel of other network APs in order to avoid interference, the mobile station 130 generally being wirelessly connected to a single AP, such as for example AP2 120. As is well known, whether the APs use different channels or not, there may be situations in which it could be preferable to hand over the mobile station to another AP, in this example AP1. Reasons for handing over the mobile station can include: noise or load from external networks, load balancing between APs, signal strength problems owing to for instance movement of the mobile station or moving objects coming between the AP and the mobile station.

Within the network 100, handover (also called 'roaming') can be managed by a WLAN controller 140, which as illustrated may be a standalone device, but which also may be implemented on one of the APs 110, 120. The WLAN 140 and the APs are generally connected in a wired or wireless network 150 illustrated by solid line in FIG. 1.

In order to manage handover, the WLAN controller 140 needs to know to which APs, a specific mobile station can be handed over. In the exemplary system in FIG. 1, where there is a single alternative AP, the WLAN controller 140 should preferably know if the mobile station can be handed over to the 'other' AP or not.

An important factor for the handover determination is the expected signal strength, i.e. the expected signal strength indicator (RSSI) at a mobile station from the AP to which it could be handed over. It is often desired that the signal strength is higher, or at least not much worse, after handover than before. Other metrics than RSSI, such as for example Received Channel Power Indicator (RCPI) or signal-to-noise ration (SNR), can also be used.

While the RSSI on the active AP usually is easily available through messages from the mobile station, the RSSI for mobile stations on alternative APs has to be predicted.

Several RSSI prediction methods exist. An example of active RSSI prediction, such as the 802.11k "Beacon report" through which the WLAN controller 140 instructs the associated AP (i.e. the one to which the mobile station is connected and thus uses for data communication)—in the example AP2 120—to request the mobile station 130 to carry out a survey of its network environment and respond with the survey result. However, this operation is disruptive to the activity of the movile station; for example the mobile station potentially has to scan other channels, which generates several frames at low Phy rates in the network, thus consuming network resources. The 802.11k specification does not indicate minimum or maximum rates for sending such beacon reports; this is thus dependent on the implementations.

While such polling provides a good measure of the RSSI at the time of polling, it is usually only a prediction of future RSSI values since many mobile stations tend to move and their RSSIs thus tend to change over time. For this reason, non-associated APs can poll mobile stations regularly, for example every 30 seconds, every minute or even every second.

However, mobile stations may react badly to what they interpret as excessive polling since this may be considered a security threat or a waste of resources, both network resources and their own batteries. Some mobile stations may hence ignore the requests when they consider the polling excessive, thus adversely affecting the prediction quality.

It will be appreciated that it is desired to have a solution that overcomes at least part of the conventional problems related to RSSI prediction in multi-AP wireless networks. The present principles provide such a solution.

SUMMARY OF DISCLOSURE

In a first aspect, the present principles are directed to a method for predicting a first metric for a station in a wireless network. A prediction device or a first access point associated with the station determines that a recent measurement of a second metric for the station has changed compared to a previous measurement of the second metric, which is correlated with the first metric and measured by the first access point. In case the second metric has changed, the prediction device triggers prediction of the first metric for the station.

Various embodiments of the first aspect include:
- That in case the determining is performed by the first access point, the first access point informs the prediction device that the second metric has changed for the station.
- That the first metric is a signal strength of a signal received by the station from a second access point not associated with the station and the second metric is a signal strength of a signal received by the first access point from the station.
- That the determining is performed by the prediction device that further receives from the first access point at least the recent measurement of the second metric and the previous measurement of the second metric.
- That it is determined that the second metric has changed in case the modulus of a difference between the recent measurement of the second metric and the previous measurement of the second metric is greater than a threshold.
- That the prediction device further stores a predicted value of the first metric, and triggers prediction of the first metric in case an age of the predicted value is above an age limit. The age of the predicted value can be calculated from a present time and a time of prediction of the first metric.

That the triggering is immediate or deferred.

In a second aspect, the present principles are directed to a device for predicting a first metric for a station in a wireless network, the device comprising at least one hardware processor configured to determine that a recent measurement of a second metric correlated with the first metric has changed compared to a previous measurement of the second metric, the second metric for the station and measured by the first access point. In case the second metric has changed, the device triggers prediction of the first metric for the station.

Various embodiments of the second aspect include:

That the at least one hardware processor is configured to determine that the second metric has changed for the station from a message received via a hardware interface from the first access point.

That the first metric is a signal strength of a signal received by the station from a second access point not associated with the station and the second metric is a signal strength of a signal received by the first access point from the station.

That the at least one hardware processor is further configured to determine that the second metric has changed by comparing the recent measurement of the second metric and the previous measurement of the second metric received from the first access point in case the modulus of a difference between the recent measurement of the second metric and the previous measurement of the second metric is greater than a threshold.

That the device further comprises memory configured for storing a predicted value of the first metric, and that the at least one hardware processor is further configured to trigger prediction of the first metric in case an age of the predicted value is above an age limit.

In a third aspect, the present principles are directed to a computer program comprising program code instructions executable by a processor for implementing the steps of a method according to any embodiment of the first aspect.

In a fourth aspect, the present principles are directed to a computer program product which is stored on a non-transitory computer readable medium and comprises program code instructions executable by a processor for implementing the steps of a method according to any embodiment of the first aspect.

BRIEF DESCRIPTION OF DRAWINGS

Preferred features of the present principles will now be described, by way of non-limiting example, with reference to the accompanying drawings, in which.

DESCRIPTION OF EMBODIMENTS

Figure 1:
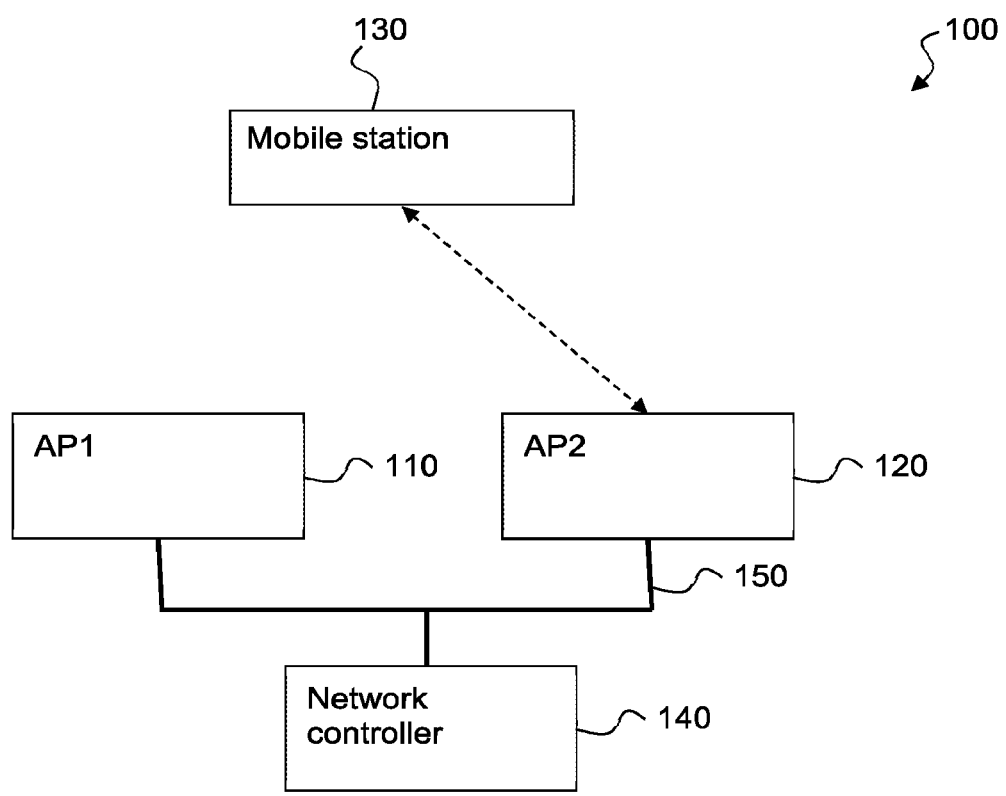
FIG. 1 illustrates a conventional Wi-Fi Protected Access (WPA) Personal protocol.
Figure 2:
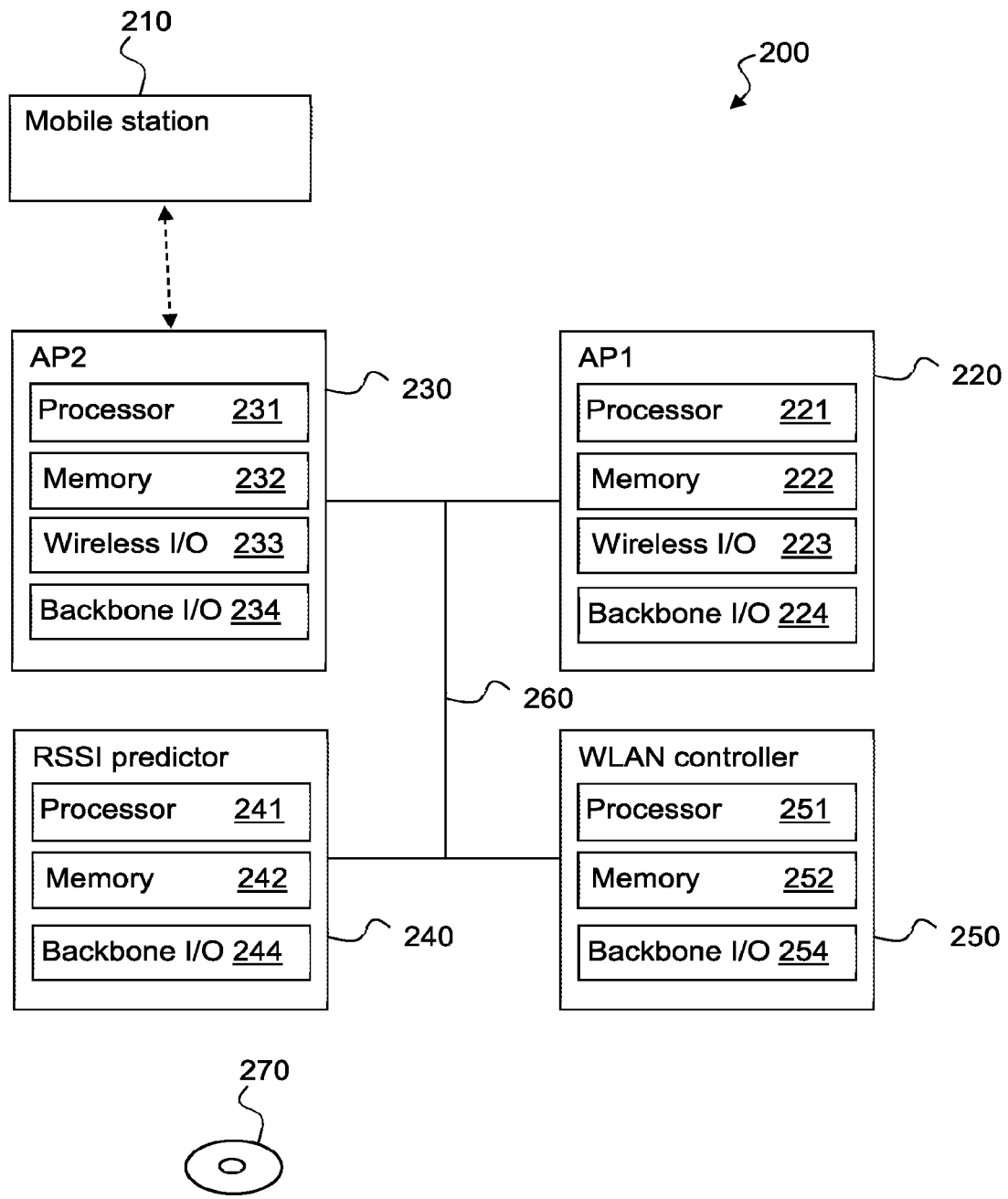
FIG. 2 illustrates an exemplary system according to a first embodiment of the present principles.

FIG. 2 illustrates an exemplary system 200 according to an embodiment of the present principles. The system 200 includes a mobile station (STA) 210, a first access point (AP1) 220 and a second access point (AP2) 230 such as a gateway. The two access points 220, 230 are configured for wireless communication with mobile stations, e.g. using Wi-Fi according to IEEE 802.11. The system 200 further includes a signal strength prediction device ("RSSI predictor") 240 and a wireless LAN (WLAN) controller 250. The APs, the RSSI predictor 240 and the WLAN controller 250 are connected by a connection 260, which preferably is wired but also can be wireless.

The mobile station 210 can be any kind of conventional device—mobile phone, tablet, sensor, etc.—compatible with the wireless communications standard used by the APs.

Each AP 220, 230 includes at least one hardware processing unit ("processor") 221, 231, memory 222, 232 and at least one wireless communications interface 223, 233, in the example a Wi-Fi interface, configured to communicate with other mobile stations, and a backbone interface 224, 234 configured for communication with the other devices connected to the connection 260. Any suitable communication standard, such as Wi-Fi (IEEE 802.11), Ethernet (IEEE 802.3), and PLC (power-line communication), could be used for the communication over the connection 260.

The APs 220, 230 are configured to operate on different channels, i.e. different frequencies, so as to avoid interference. The channel allocation, which preferably is dynamic, can be performed in any suitable conventional way. It should however be noted that the present principles apply also when the APs are configured to operate on the same channel.

The RSSI predictor 240 and the WLAN controller 250 each include at least one hardware processing unit ("processor") 241, 251, memory 242, 252 and a backbone interface 244, 254 configured for communication with the other devices connected to the connection 260. The RSSI predictor 240 and the WLAN controller 250 can be stand-alone devices or be implemented on another device in the system 200, such as on an AP, or in an external network, or in the Cloud. In particular, the RSSI predictor 240 can be implemented in the WLAN controller 250.

The system could also include a gateway device (not shown) configured to connect the system 200 to an external network such as the Internet. The gateway device can be a stand-alone device, but it can also be implemented on one of the devices connected to the connection 260, for example an AP.

The memories 222, 232, 242, 252, which can be implemented as a plurality of memory circuits possibly of different types, are configured to store software instructions for execution by the respective processors 221, 231, 241, 251, and also for various data necessary for performing the respective functions described herein.

The skilled person will appreciate that the illustrated devices are very simplified for reasons of clarity and that real devices in addition would include features such as internal connections and power supplies. Non-transitory storage media 270 stores instructions that, when executed by processor 241, perform the functions of the RSSI predictor 240 as further described hereinafter with reference to FIG. 3.

A salient point of the present principles is that the signal strength from the mobile station 210 received by the associated AP—in this example AP2 230—is used in order to reduce the use of active RSSI prediction methods in the network 200.

Briefly speaking, the present principles assume that if the signal strength from a mobile station at an associated AP changes, then there is a high probability that the signal strengths for the mobile station at non-associated APs also change. Conversely, if the signal strength from a mobile station at an associated AP does not change, then there is a high probability that the signal strengths for the mobile station at non-associated APs also remain unchanged.

Based on these assumptions, the RSSI predictor 240 keeps the existing RSSI prediction in case the received signal strength does not change. If the received signal strength does change, possibly by at least a certain amount, the RSSI predictor 240 can trigger a poll, i.e. an active prediction method such as the 802.11k Beacon report. The poll can be triggered immediately to have a present prediction, or triggered after a delay to allow the value to stabilise (e.g. in case the mobile station moves).

Figure 3:
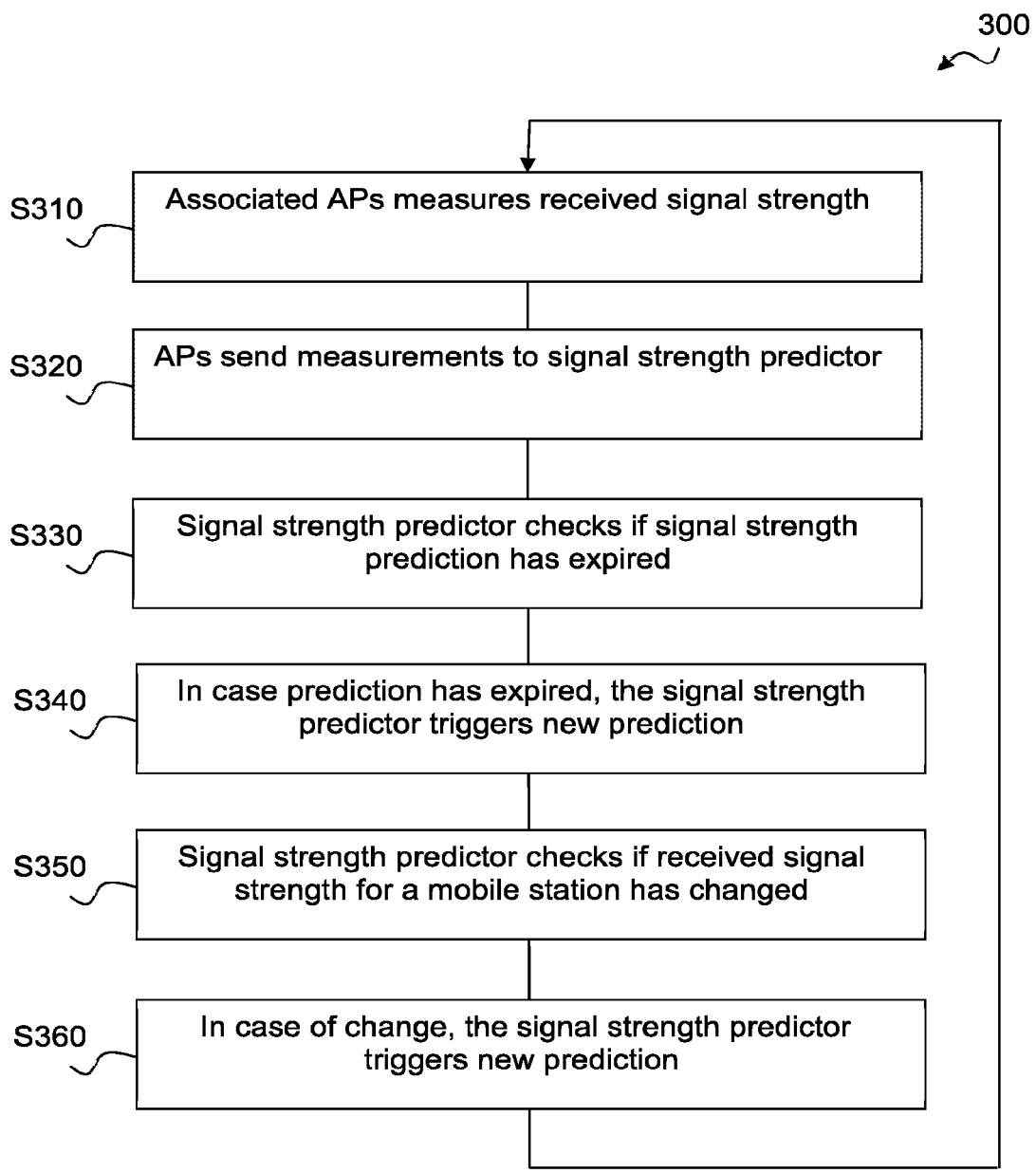
FIG. 3 illustrates an exemplary method for signal strength prediction according to an embodiment of the present principles.

FIG. 3 illustrates a flow chart for a method 300 of signal strength prediction at a RSSI predictor 240 according to an embodiment of the present principles.

In step S310, the processor 231 of AP2 230 measures the signal strength received from each of its associated mobile stations; in this example, from mobile station 210. The signal strength measurement is preferably performed repeatedly, at relatively short time intervals such as every second or every two seconds. The skilled person will appreciate that all APs are equipped for this measurement.

In step S320, the processor 231 of AP2 230 sends the measured signal strengths to the RSSI predictor 240. This can be done after every round of measurements, after a given number of measurements (that are then transmitted as a group), or only when a measured signal strength has changed. A time of measurement can be associated with each measured value.

In the case where only changed measured signal strengths are sent, the processor 231 stores at least one previous measured signal strength for the mobile station for comparison purposes, possibly in memory 232. In addition, at least one threshold value is used to determine if the signal strength has changed; this is in order to filter out small signal strength variations that are not likely to be indicative of changes that requires triggering of a poll. Storing a single measured signal strength enables detection of instant changes, while storing a plurality of measured signal strengths can allow detection of slow changes over time; different threshold values can be used depending on the age of the stored measurement compared to the most recent measurement.

In step S330, the processor 241 of the RSSI predictor 240 checks for each mobile station if a predicted signal strength (e.g. one received in response to a beacon report or other poll) stored in the memory 242 is older than a threshold. The threshold is preferably the same as the combined time for which the APs or the RSSI predictor 240 stores signal strength measurements; if there are ten seconds worth of measured signal strength—for example 10 measurements made with one-second intervals or 5 measurements made with two-second intervals—then the threshold is ten seconds.

In case, the predicted signal strength is older than the threshold, the processor 241 of the RSSI predictor 240 triggers a new prediction in step S340, for example a new poll or other active prediction method.

In step S350, the processor 241 of the RSSI predictor 240 compares the most recent signal strength measurement for a mobile device with older measurements (such as up to the time threshold) received from the associated AP or stored in memory 242.

As already mentioned, a plurality of change thresholds may be used. There may be an instant change threshold to determine if the most recent measurement has changed more than a margin; in other words, if the modulus of the difference between the most recent measurement and the previous measurement is greater than the threshold. There may also be thresholds to determine sliding changes, i.e. if the modulus of the difference between the most recent measurement and a measurement older than the previous one is greater than the relevant threshold. In case a change is greater than a related threshold, it is determined that the signal strength has changed.

The skilled person will appreciate that step S350 can also be performed by the processor 231 of the associated AP 230, which in case the signal strength has changed sends a message to inform the RSSI predictor 240 that the signal strength has changed for a given mobile station (or mobile stations). The RSSI predictor 240 then determines that the signal strength has changed from this message.

In case the signal strength has changed, in step S360, the RSSI predictor 240 triggers a new prediction. As already mentioned, the new prediction can be triggered immediately, but it is also possible to delay the prediction method—such as the beacon report or other poll—by a time that can be preset or dependent on for example the measured signal strength or the amount of change of the measured signal strength.

The skilled person will understand that the present principles can also be used to obtain predictions of other network metrics than RSSI, such as signal-to-noise (SNR) ratio, information on the physical location of the mobile station (such as GPS coordinates) or medium available, that require invasive measurements. These invasive measurements can for example require disruptive actions that interrupt data transmission and reception; an example is responding to the beacon report. The present principles assume that there is a correlation between the network metric(s) to be predicted and the measured network metric(s).

However, if the signal strength prediction is not too old and the measured signal strength has not changed, then the stored signal strength prediction is maintained for the mobile station in question.

The method 300 then iterates, preferably at the same period as the signal strength measurements.

As will be appreciated, the present principles can provide RSSI prediction that are less intrusive by using active prediction methods less often than in similar conventional solutions. At the same time, since the RSSI prediction is dynamic rather than performed at regular intervals, the present principles can provide a quicker response to changes in the network.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

What is claimed:

1. A method for managing a wireless network implemented by a first access point of a wireless local area network (WLAN), the method comprising:
    measuring a first metric between the first access point and a station at a first time, wherein the station is associated with the first access point;
    measuring the first metric between the first access point and the station at a second time, wherein the second time is prior to the first time;
    sending a request to the station to survey all available access points, including a second access point not associated with the station, wherein the request is sent on a condition that a second metric is predicted to change based on the measurements of the first metric at the first time and the measurements of the first metric at the second time;
    receiving survey results in response to sending the request to the station to survey all available access points in the WLAN, wherein the survey results include a measurement of the second metric between the station and each of the available access points, including the second access point; and
    sending handover instructions to the station for the station to associate with the second access point based on the survey results.

2. The method of claim 1, wherein the first metric and the second metric are different, and the first metric is one of Received Signal Strength Indicator (RSSI), Received Channel Power Indicator (RCPI), or signal-to-noise ration (SNR), and wherein the second metric is one of RSSI, RCPI, or SNR.

3. The method of claim 1, wherein first metric and the second metric are the same, and the first metric and the second metric are both one of Received Signal Strength Indicator (RSSI), Received Channel Power Indicator (RCPI), or signal-to-noise ration (SNR).

4. The method of claim 1, wherein the request is sent further based on a condition of that the difference between the first metric at the first time compared to the first metric at the second time exceeds a threshold.

5. The method of claim 1, wherein the request is sent further based on a condition of that a time difference between the first time compared to the second time exceeds a threshold.

6. The method of claim 1, wherein measuring of the first metric between the first access point and the station occurs at a plurality of times at regular time intervals.

7. The method of claim 1, wherein the request is sent a period of time after a comparison between more than one time is made.

8. The method of claim 1, wherein the request is sent immediately after a comparison between more than one time is made.

9. The method of claim 1, wherein the first access point is a gateway of the WLAN.

10. A device for managing a wireless network implemented by a first access point of a wireless local area network (WLAN), the device comprising:
    a processor coupled to one or more hardware components, wherein
        the processor in conjunction with the one or more hardware components configured to measure a first metric between the first access point and a station at a first time, wherein the station is associated with the first access point;
        the processor in conjunction with the one or more hardware components configured to measure the first metric between the first access point and the station at a second time, wherein the second time is prior to the first time;
        the processor in conjunction with the one or more hardware components configured to send a request to the station to survey all available access points, including a second access point not associated with the station, wherein the request is sent on a condition that a second metric is predicted to change based on the measurements of the first metric at the first time and the measurements of the first metric at the second time;
        the processor in conjunction with the one or more hardware components configured to receive survey results in response to sending the request to the station to survey all available access points in the WLAN, wherein the survey results include a measurement of the second metric between the station and each of the available access points, including the second access point; and
        the processor in conjunction with the one or more hardware components configured to send handover instructions to the station for the station to associate with the second access point based on the survey results.

11. The device of claim 10, wherein the first metric and the second metric are different, and the first metric is one of Received Signal Strength Indicator (RSSI), Received Channel Power Indicator (RCPI), or signal-to-noise ration (SNR), and wherein the second metric is one of RSSI, RCPI, or SNR.

12. The device of claim 10, wherein first metric and the second metric are the same, and the first metric and the second metric are both one of Received Signal Strength Indicator (RSSI), Received Channel Power Indicator (RCPI), or signal-to-noise ration (SNR).

13. The device of claim 10, wherein the request is sent further based on a condition of that the difference between the first metric at the first time compared to the first metric at the second time exceeds a threshold.

14. The device of claim 10, wherein the request is sent further based on a condition of that a time difference between the first time compared to the second time exceeds a threshold.

15. The device of claim 10, wherein measuring of the first metric between the first access point and the station occurs at a plurality of times at regular time intervals.

16. The device of claim 10, wherein the request is sent a period of time after a comparison between more than one time is made.

17. The device of claim 10, wherein the request is sent immediately after a comparison between more than one time is made.

18. The device of claim 10, wherein the first access point is a gateway of the WLAN.

* * * * *